(12) United States Patent
Chong

(10) Patent No.: US 6,371,658 B2
(45) Date of Patent: *Apr. 16, 2002

(54) TUNED MULTIPLE FIBER OPTIC CONNECTOR

(75) Inventor: Nyuen Chong, Kanata (CA)

(73) Assignee: JDS Fitel Inc., Nepean (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/255,333

(22) Filed: Feb. 23, 1999

Related U.S. Application Data

(60) Provisional application No. 60/075,965, filed on Feb. 24, 1998.

(51) Int. Cl.[7] ................................................. G02B 6/38
(52) U.S. Cl. .......................... 385/59; 385/76; 385/77; 385/78; 385/67; 385/52
(58) Field of Search .................... 385/52, 76, 77, 385/78, 59, 67

(56) References Cited

U.S. PATENT DOCUMENTS

| | | | |
|---|---|---|---|
| 4,385,801 A | * | 5/1983 | Bubanko ..................... 385/63 |
| 4,738,507 A | * | 4/1988 | Palmquist .................... 385/78 |
| 4,880,291 A | | 11/1989 | Aberson, Jr. et al. |
| 4,953,941 A | * | 9/1990 | Takahashi .................... 385/72 |
| 5,037,179 A | * | 8/1991 | Bortolin et al. ............... 385/54 |
| 5,390,269 A | * | 2/1995 | Palecek ....................... 385/78 |
| 5,430,819 A | | 7/1995 | Sizer, II etr al. .............. 385/59 |
| 5,590,229 A | | 12/1996 | Goldman et al. ............. 385/59 |
| 5,619,604 A | | 4/1997 | Shiflett et al. ................ 385/59 |
| 5,671,311 A | | 9/1997 | Stillie et al. .................. 385/89 |
| 5,778,123 A | * | 7/1998 | Hagan et al. ................. 385/76 |
| 5,838,856 A | * | 11/1998 | Lee ............................. 385/59 |
| 5,980,117 A | * | 11/1999 | Feuer et al. .................. 385/59 |
| RE37,080 E | * | 3/2001 | Stephenson .................. 385/78 |

* cited by examiner

*Primary Examiner*—Cassandra Spyrou
*Assistant Examiner*—Leo Boutsikaris
(74) *Attorney, Agent, or Firm*—Neil Teitelbaum

(57) ABSTRACT

A tuned multiple fiber optical connector and a method for tuning same is disclosed. A first connector housing retains each of a first plurality of optical fiber ends in a predetermined location. The first connector housing has a first key element. A core of each of the first plurality of optical fiber ends is oriented in a predetermined fashion with respect to the first key element. A second connector housing retains each of a second plurality of optical fiber ends in a predetermined location. The second connector housing comprises a second key element. A core of each of the second plurality of optical fiber ends is oriented in a predetermined fashion with respect to the second key element. The first and the second connector housings are coupled such that the key elements are disposed in a predetermined relation one to the other. Therefore, the core of each of the first plurality of optical fiber ends is substantially in alignment with the core of a corresponding optical fiber end of the second plurality of optical fiber ends.

16 Claims, 8 Drawing Sheets

FIG. 5A   FIG. 5B

TUNED MULTIPLE FIBER OPTIC CONNECTOR

This application claims benefit of Prov. No. 60/075,965 filed Feb. 24, 1998.

FIELD OF THE INVENTION

The present invention relates to a connector for receiving and connecting multiple optical fiber ends. In particular, the present invention relates to a tunable multiple optical fiber connector for tuning the core position of each fiber in the connector to optimize coupling efficiency.

BACKGROUND OF THE INVENTION

In fibre based optical systems, signals propagate within optical fibres. When optically coupling two components, a fiber is coupled at a first end to a first component and at a second end to a second component. Often in an optical system, a plurality of fibres is routed within the system. When a large number of fibres are used, designs often incorporate cables comprising a number of fibres and having a single connector at each end of the cable. The single multi-fibre connector is provided with bores for accepting optical fibres. Into each bore, a fiber is inserted and held in place. Unfortunately, the bores are not always precisely located and, in order to insert a fibre, the bores must be larger in diameter than the outside diameter of the fibres in order to accommodate the fibres.

Small irregularities in ferrule and fibre manufacture can result in significant signal loss, particularly in coupling single mode fibres. A standard ferrule has an internal diameter closely matching a fibre diameter. However, a ferrule having for example an internal diameter of 128 $\mu$m provided with a fibre having a diameter of 127 $\mu$m may be placed up to 0.5 $\mu$m from the concentric axis, equalling a total possible eccentricity of the optical fibre of 1 $\mu$m. In addition, the bore of the ferrule in manufacture may not be concentrically placed. Tuning is thus necessary to optimize the position of the fibre ends within a connector and thereby adjust the coupling efficiency. For example, a simple tuning apparatus allows for insertion of a connector in any of a plurality of orientations. Once inserted, the connector is fixed in its orientation and, therefore, the coupling efficiency remains substantially constant and is improved when coupling is between two ends having similar orientations.

Unfortunately, when using cables comprising multiple fibres, each fibre coupling may result in significant loss. Tuning of fibres by moving the two connector ends does not result in each fibre pair being independently tunable. The relative placement of the connector ends cannot be reoriented because the fibre connections would change. When different fibres within a cable have alignment errors as is commonly noted, it is near impossible to find two connectors that couple efficiently for all fibre pairs. For example, when correct alignment is sufficiently approximated by aligning the connectors in one of four orientations, there is a one in four chance of a good coupling. Through tuning of a single fibre connector, the coupling is easily altered to achieve a most efficient coupling from the four available orientations. When two fibres are incorporated into a cable, there are 16 possible orientations and since tuning is not available, only one in 16 connectors provides good coupling with an existing connector. When a cable having 32 fibres is used, the chance of finding two that mate with reasonable coupling efficiency is very small.

For more efficient installation of multi fiber or ribbon fibres the coupling of multiple fibre ends at a single multi-fibre-connector pair, heretofore, has not been satisfactory. U.S. Pat. No. 5,671,311 to Stillie et al. discloses a method of aligning a number of receiving ferrules within a less precise housing by providing aligning pins for locating the ferrule bores in the housing. Once the ferrules are positioned the fibres are then inserted. This is a rather imprecise method, which does not provide an opportunity to correct transmission problems once the fibres and light sources are in place. Also, since the fibre is inserted after the tuning is performed, slack between the ferrule and the fibre can be a significant problem.

Alternative multiple fibre connectors are disclosed in U.S. Pat. No. 5,430,819 to Sizer II et al. A first connector manufactured by AT&T under the trademark MACII, secures a plurality of exposed fibre ends between a pair of silicon wafers having a groove precision etched to locate each fibre end. A second connector in accordance with the invention of Sizer II et al. provides a pair of substrate plates having fibre-sized holes etched through the substrate for locating each fibre end. Both of these methods require absolutely precise manufacturing at considerable cost, since no tuning adjustment of individual fibres is possible.

Tuning of single optical fibre connectors is known. For example, it is known to provide a keying mechanism on an optical fibre connector to prevent rotation of the optical fibre cable once a desired coupling position has been determined, as described in U.S. Pat. No. 5,096,276 to Gerace et al. The key element may be an asymmetric shape or a pin or the like in a push-pull plug type connector.

Two fibre ends joined in a connector may each be supported in a ferrule or similar housing. Most commonly a cylindrical ferrule with a central bore substantially the diameter of the exposed fibre is used to support the fibre end within the connector. As recognized in U.S. Pat. No. 4,738,508 to Palmquist, and also in U.S. Pat. No. 5,390,269 to Palacek et al., tuning of the ferrules within the connector is also needed to achieve high performance connection with low insertion loss.

Palacek and Palmquist propose providing multiple rotatable orientations of a fibre and ferrule within the connector by placing the ferrule within a housing or collar having facets or knurls for mating with a receiving housing.

It is an object of the invention to provide a connector for receiving and connecting multiple optical fibre ends, in which each optical fibre core is oriented in a predetermined fashion with respect to a key element of a connector housing.

SUMMARY OF THE INVENTION

Accordingly, the present invention related to a tuned multiple fibre optic connector for connecting a first plurality of optical fibre ends to a second plurality of optical fibre ends, each fibre end having an eccentrically positioned core therein, comprising:

a first connector housing comprising a first key element, the first connector housing for retaining each of the first plurality of optical fibre ends, the core of each of the first plurality of optical fibre ends oriented with respect to the first key element in a predetermined azimuthal fashion in a plane perpendicular to the longitudinal axis of the fibre; and first coupling means for coupling the first connector housing to another connector housing.

Another aspect of the present invention relates to a tuned multiple fibre optic connector for connecting a first plurality of optical fibre ends to a second plurality of optical fibre ends, each fibre having an eccentrically positioned core therein, comprising:

a first plurality of optical fibre ends, wherein each optical fibre end is retained in a ferrule having at least an indicator element such that a core of the optical fibre end is oriented in a plane perpendicular to the longitudinal axis of the fibre, the orientation in a predetermined azimuthal fashion with respect to an indicator element of the ferrule; a first connector housing comprising a first key element, the first connector housing for retaining each of the first plurality of optical fibre ends in a predetermined location such that the indicator elements of the ferrules are disposed in a predetermined azimuthal relation to the first key element of the first connector housing; and first coupling means for coupling the first connector housing to another connector housing.

Exemplary embodiments of the invention will now be described in conjunction with the drawings, in which:

FIG. 5A is an isometric view of the connector of FIG. 5 comprising a colour code as a key element;

FIG. 5B is an isometric view of the connector of FIG. 5 comprising a pin and a hole as a key element;

Figure 9A:
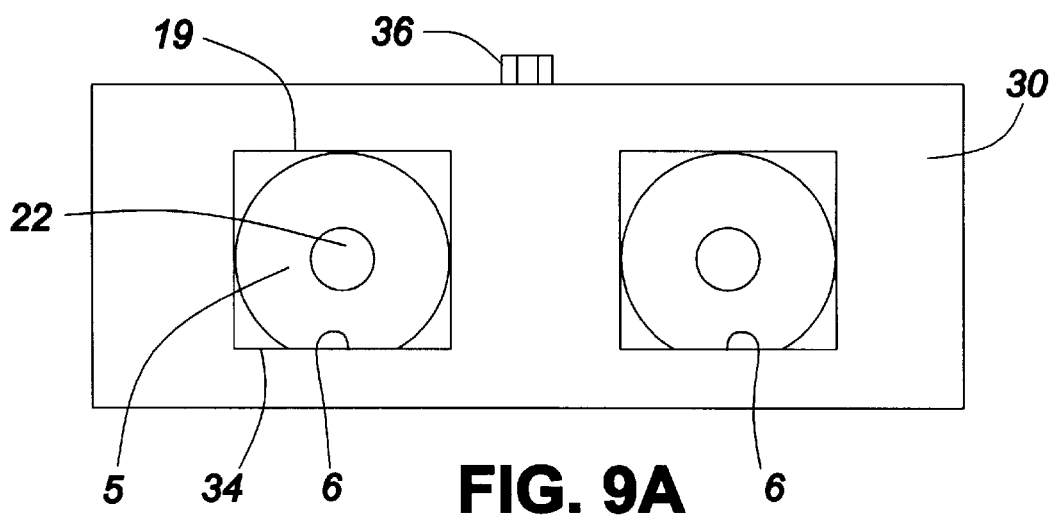
FIG. 9A is a transverse sectional view of a tuned multiple optical connector in accordance with the present invention, wherein optical fibre ends are supported by a ferrule and the ferrule has a flattened face for engaging with a side wall of a bore.
Figure 9B:
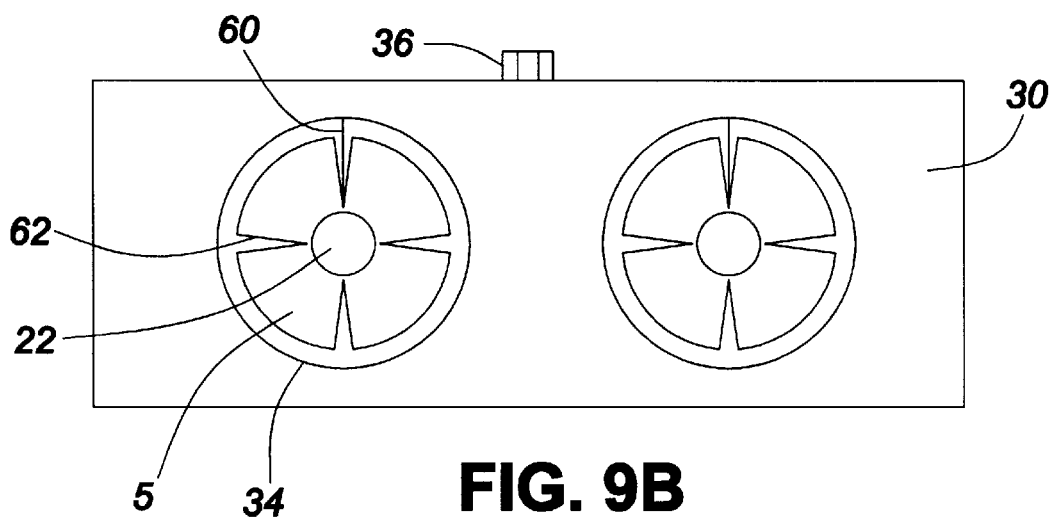
FIG. 9B is a transverse sectional view of a tuned multiple optical connector in accordance with the present invention, wherein optical fibre ends are supported by a ferrule and the ferrule has grooves for engaging with a pin mounted within a bore.
Figure 9C:
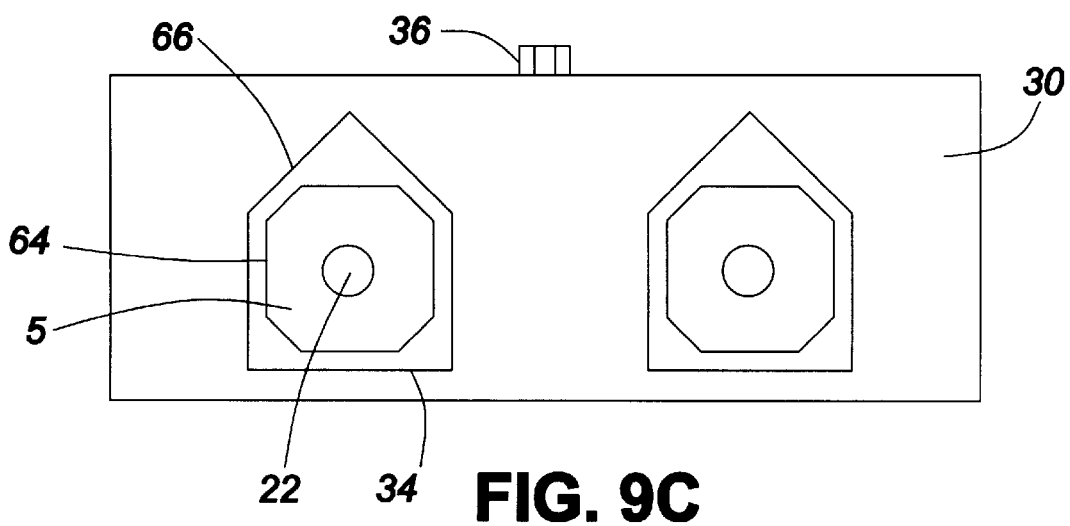
FIG. 9C is a transverse sectional view of a tuned multiple optical connector in accordance with the present invention, wherein optical fibre ends are supported by a ferrule and the ferrule has an octagonal collar for engaging with matching surfaces a bore.
Figure 9D:
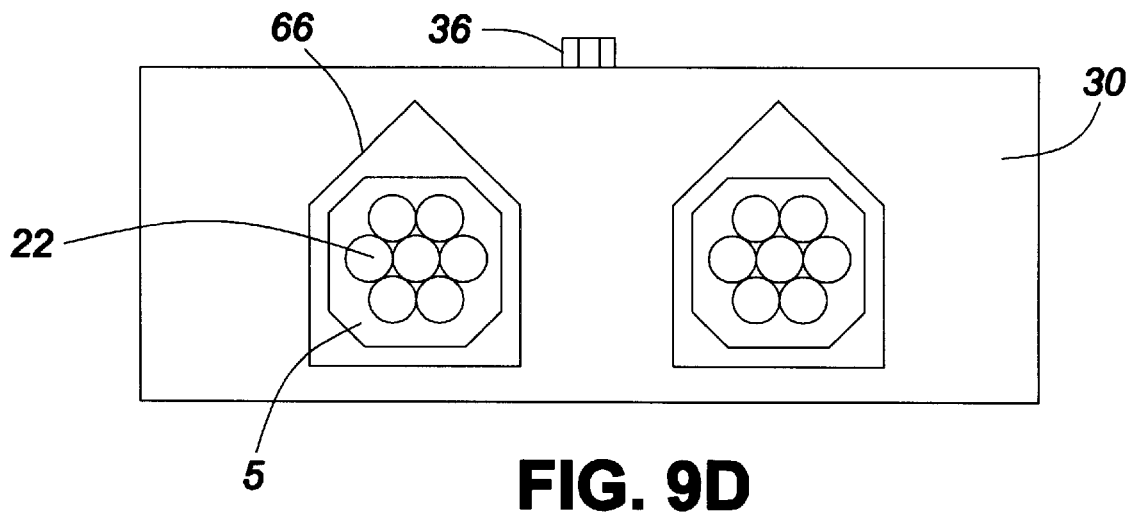
Figure 9E:
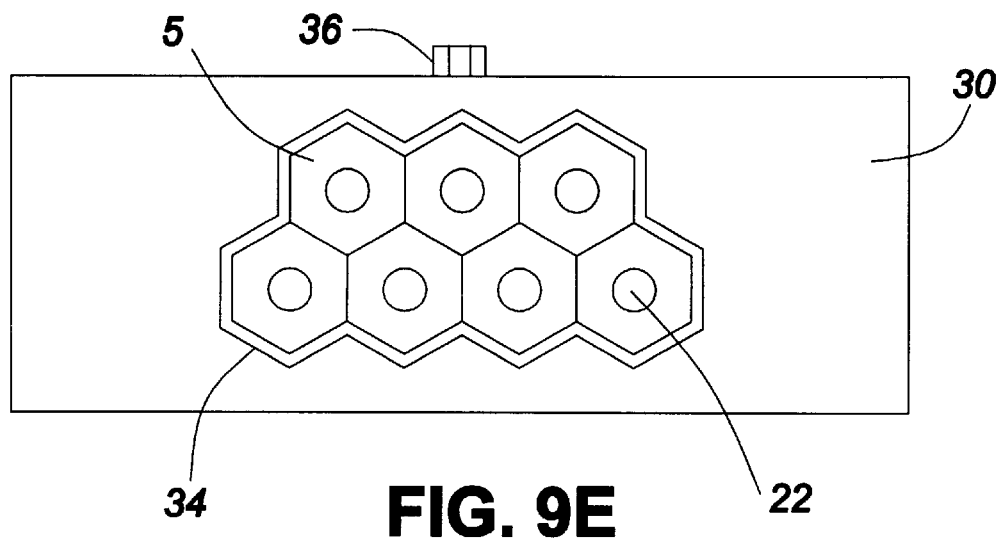

FIG. 9D is a transverse sectional view of a tuned multiple optical connector in accordance with the present invention, wherein optical fibre ends are supported by a ferrule and the ferrule retains a plurality of optical fibre ends; and, FIG. 9E is a transverse sectional view of a tuned multiple optical connector in accordance with the present invention, wherein optical fibre ends are supported by a ferrule and a plurality of ferrules are retained in a single bore.

DETAILED DESCRIPTION

Figure 1A:
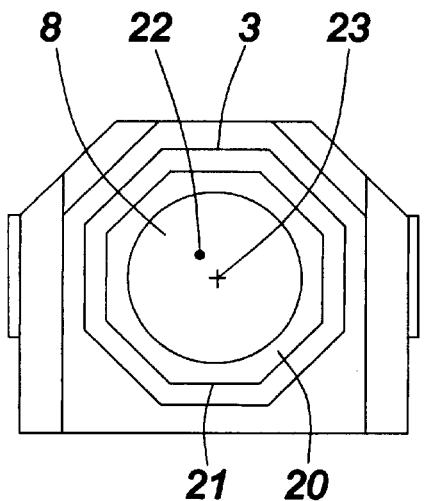
FIG. 1A is a transverse sectional view of a prior art, single fibre connector prior to tuning.
Figure 1B:
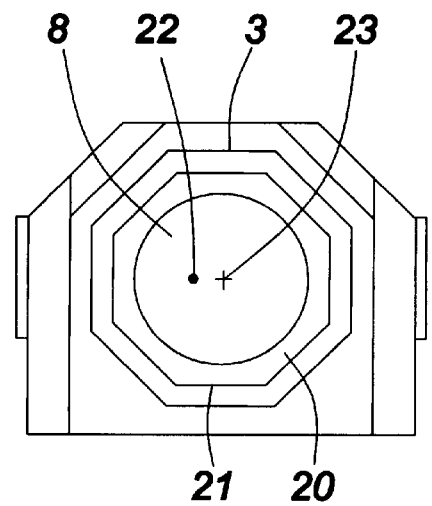
FIG. 1B is a transverse sectional view of the connector of FIG. 1A subsequent to tuning.

FIGS. 1A and 1B show an optical fibre end 22 within a prior art single tunable connector. The ferrule 8 supporting the fibre end 22 is surrounded by an octagonal collar 20 having outer faces 21. The connector includes a positioning channel 3 for engaging the faces 21 of the ferrule collar 20. The center of the ferrule 8 is marked 23. It can be seen in FIG. 1A that the fibre end 22 is positioned eccentrically. The eight faces of the collar 20 provide eight rotational positions for placing the ferrule within the connector. A position is chosen for most efficiently coupling the fibre end to a connecting fibre end disposed within an associated mating connector element.

Figure 2A:
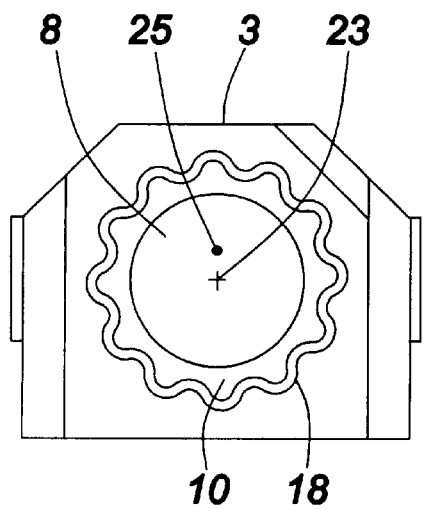
FIG. 2A is a transverse sectional view of a further prior art single fibre connector prior to tuning.
Figure 2B:
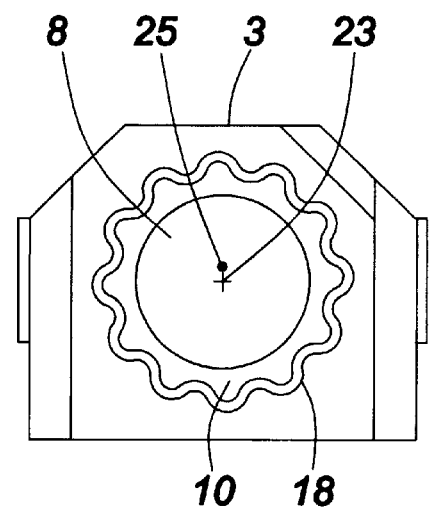
FIG. 2B is a transverse sectional view of the connector of FIG. 2A subsequent to tuning.

FIGS. 2A and 2B show an alternative embodiment of the single prior art connector. The outer collar 10 has twelve ridges and depressions about the ferrule 8. As a result twelve positions within the connector are possible, allowing greater flexibility to the fibre positioning.

In modern communication networks a large amount of data is transferred via fibre optic cables. Fibre optic cables usually comprise a large number of individual optical fibres arranged, for example, in a ribbon like structure. Using a single connector for each fibre in order to connect two fibre optic cables is not a practical solution. The cable has to be split into the individual fibres a sufficient distance from the end so as to be able to connect each fibre pair individually. Further, substantial space is required for the large amount of connectors. This creates a large amount of fibres that are no longer aligned, crossing each other in different orientations. In such a confusing situation it is very likely that the wrong fibres are connected to each other. Also, maintenance and reliability are reduced because of the tangle of fibres that results. Therefore, it is preferable to connect the ends of two fibre optic cables with a single coupling.

Figure 3:
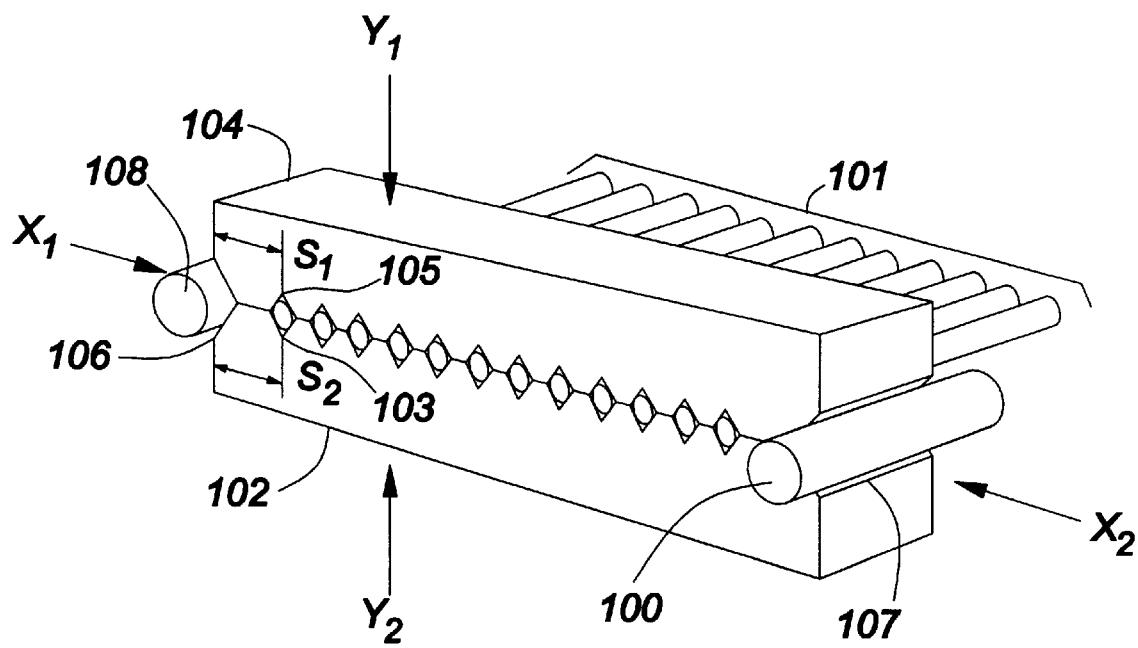
FIG. 3 is an isometric view of a prior art MACII multiple optical fibre connector.
Figure 4:
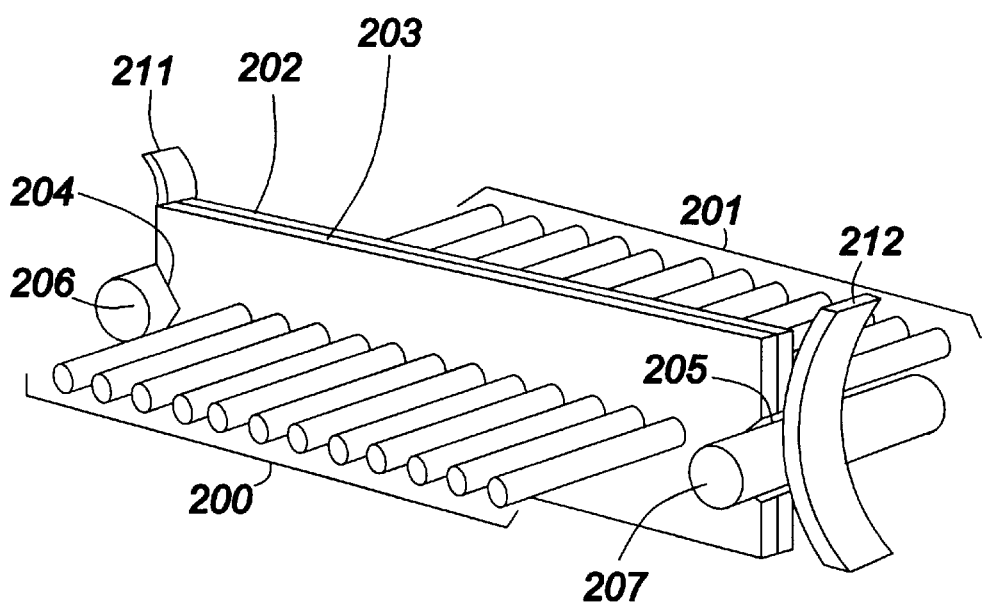
FIG. 4 is an isometric view of a further prior art multiple optical fibre connector.

FIGS. 3 and 4 illustrate prior art multiple connectors in which exposed fibre ends 101 and 201 are aligned in precisely machined locating plates. In both embodiments provision is made to adjust horizontal or vertical positioning of all of the fibre ends together to couple with an aligned additional set of fibre ends. No tuning of individual fibres is possible. Consequently, manufacturing irregularities such as variability in fibre diameter, eccentricity of the fibre core or variability in the machining of the plate cannot be compensated resulting in significant signal loss with each fibre coupling.

Figure 5:
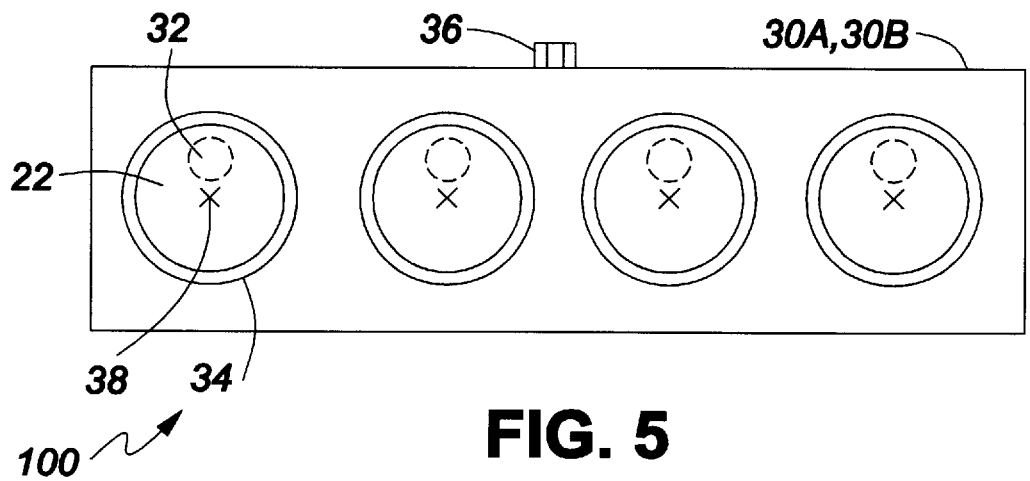
FIG. 5 is a transverse sectional view of a tuned multiple optical connector in accordance with the present invention.
Figure 5C:
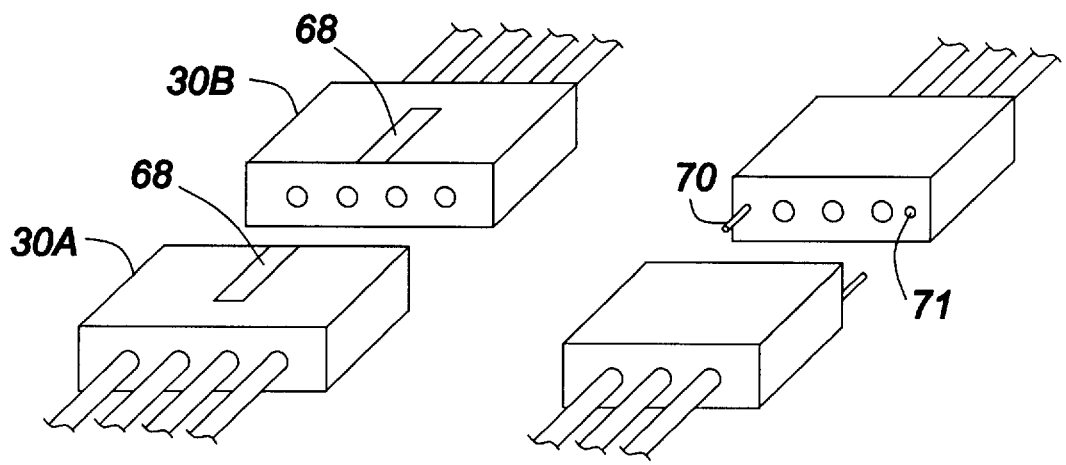
FIG. 5C is an isometric view of the connector of FIG. 5 comprising an asymmetric housing as a key element.
Figure 5C:
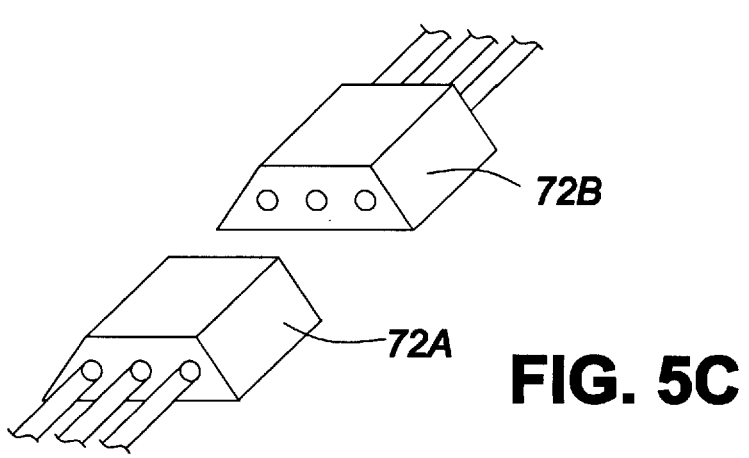

FIG. 5 illustrates a transverse section through a multiple optical connector 100 in accordance with the present invention. The multiple optical connector 100 comprises a first housing 30A and a second housing 30B. Each housing 30A, 30B comprises a plurality of bores 34 for retaining the first and the second plurality of optical fibre ends 22, respectively. Each of a plurality of optical fibre ends 22 is retained in a bore 34 within the connector housings 30A, 30B such that an optical fibre core 32 is in a plane perpendicular to the longitudinal axis of the fibre above the centre 38 of the bore 34 retaining the optical fibre end 22. In such an arrangement, each fibre core 32 is oriented with respect to a key element 36. The key elements 36 of the connector housings 30A, 30B are mating key elements for substantially limiting the coupling of the two connector housings 30A, 30B to a single orientation. When the connector housings 30A, 30B are coupled the key elements 36 are disposed in a predetermined relation one to the other. The core 32 of each optical fibre end 22 retained in the first connector housing 30A is then substantially in alignment with the core 32 of a corresponding optical fibre end 22 retained in the second connector housing 30B. Key elements 36 are for example as illustrated in FIGS. 5B to 5C: a pin 70 to fit in a hole 71 or asymmetric connector housings 72A, 72B. Alternatively as shown in FIG. 5A, the key element is other than a mating element, for example a coloured mark 68.

Such a connector is manufactured by iteratively determining the core orientation of each optical fibre end 22 with respect to a reference point. When the core orientation is substantially the predetermined core orientation the optical fibre end 22 is affixed in the connector housing 30 such that the core 32 is oriented in a predetermined fashion with respect to the key element 36 of the connector housing 30. For example, the optical fibre ends 22 are affixed in the connector housing 30 using an adhesive such as epoxy. When the core orientation is other than the predetermined orientation, the core orientation is altered.

Provision of fibre optic cables with tuned and standardised multiple optical connectors, for example the fibre cores of all connectors are oriented in a same fashion as illustrated in FIG. 5, allows a user to connect fibre optic cables easily without a significant signal loss.

Figure 6A:
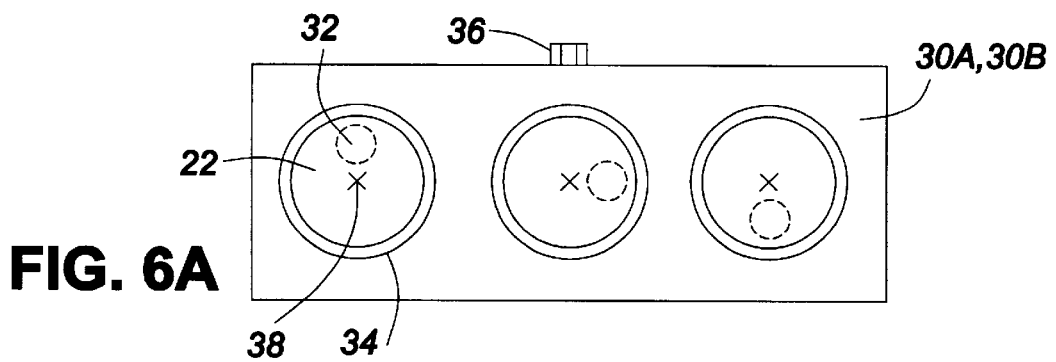
FIG. 6A is a transverse sectional view of a tuned multiple optical connector in accordance with the present invention indicating a fibre core orientation.
Figure 6B:
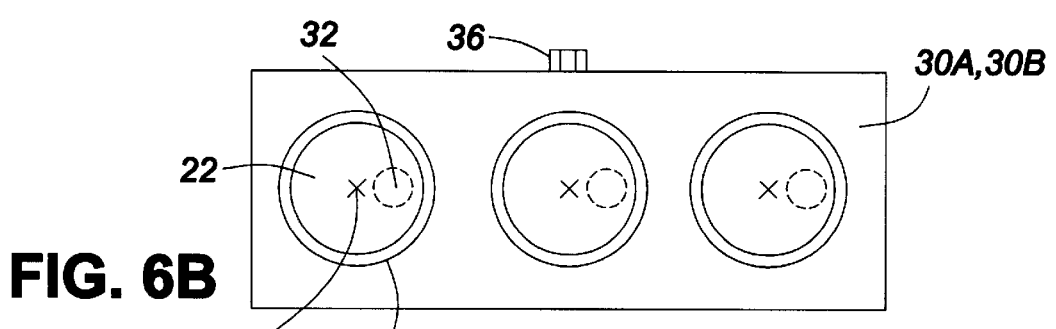
FIG. 6B is a transverse sectional view of a tuned multiple optical connector in accordance with the present invention indicating a fibre core orientation.
Figure 6C:
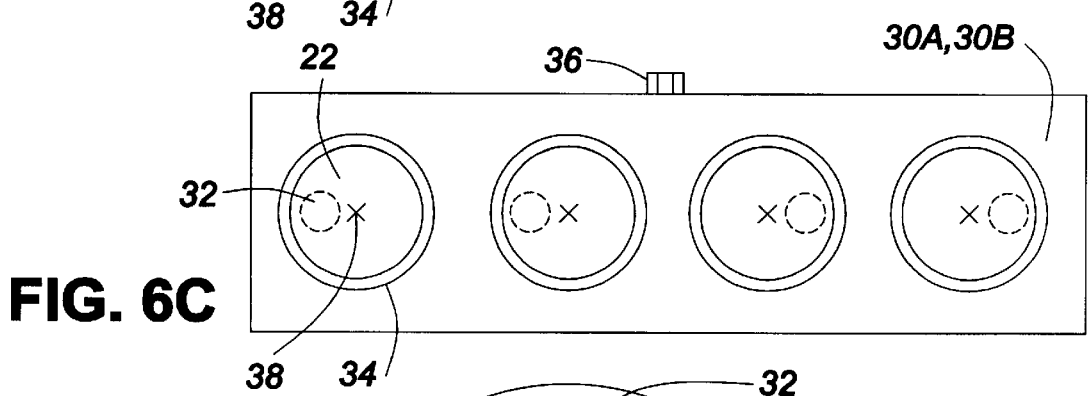
FIG. 6C is a transverse sectional view of a tuned multiple optical connector in accordance with the present invention indicating a fibre core orientation.
Figure 6D:
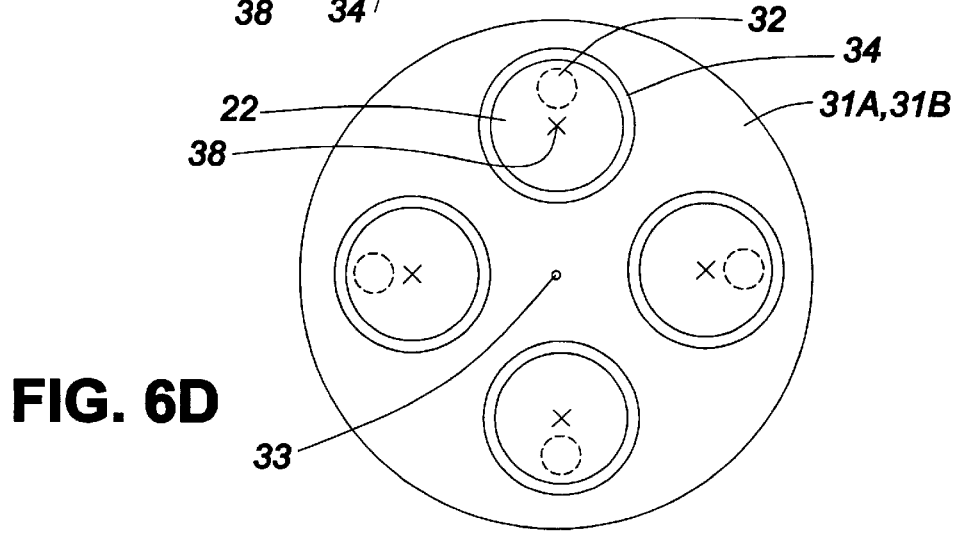
FIG. 6D is a transverse sectional view of a tuned multiple optical connector in accordance with the present invention indicating a fibre core orientation.

FIGS. 6A to 6D illustrate numerous possibilities to arrange the core orientation of the optical fibre ends 22 according to the present invention. The illustration in FIG. 6A shows the cores 32 of the optical fibre ends 22 having different orientations -up, right and down-. Such an arrangement of the fibre cores necessitates two different connector housings 30A, 30B for coupling, one being a mirror image of the other. In the arrangement shown in FIG. 6B the cores 32 of all optical fibre ends 22 point to one direction. Two connector housings 30A, 30B having such an arrangement are mated by turning one connector housing upside down. FIG. 6C shows the fibre cores 32 retained in the left half of the connector housings 30A, 30B pointing to the left whereas the fibre cores 32 retained in the right half of the connector housings 30A, 30B are pointing to the right. Two such connector housings 30A, 30B are coupled either upside pointing to upside or one connector housing turned upside down relative to the other. The arrangements shown in FIGS. 5 and 6A to 6C are useful for different embodiments of ribbon connectors. FIG. 6D shows an arrangement of optical fibres 22 in a circular fashion, their cores 32 pointing from the centre 33 of the circle outward. Such a connector allows coupling of two connector housings 31A, 31B in as many positions as the number of optical fibres 22 retained in the connector housings 31A, 31B by turning one housing about its centre 33. Of course, when a single connector orientation is desired, a key for substantially limiting connector coupling orientation is included within the connector.

Figure 7A:
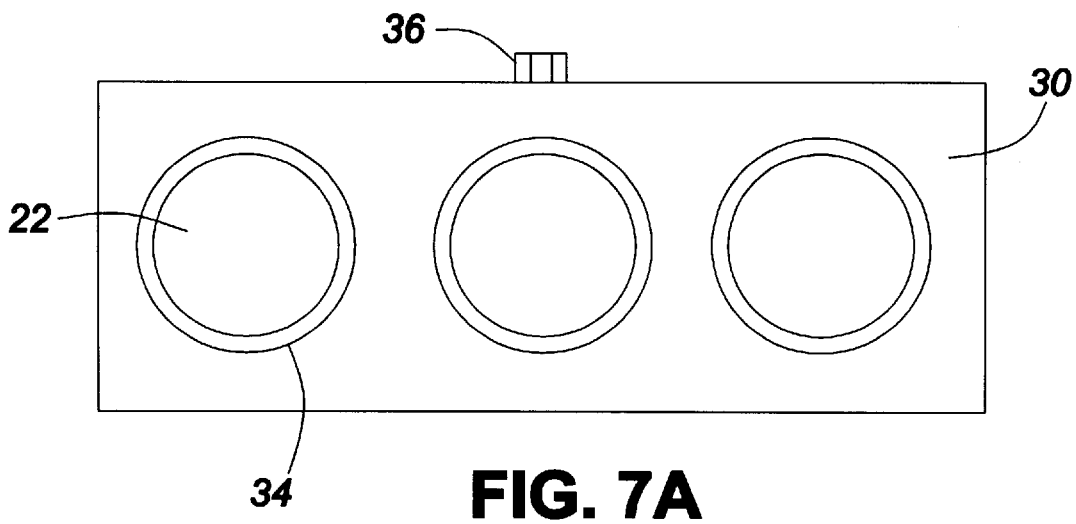
FIG. 7A is a transverse sectional view of a tuned multiple optical connector in accordance with the present invention wherein each optical fibre is retained in a separate bore.
Figure 7B:
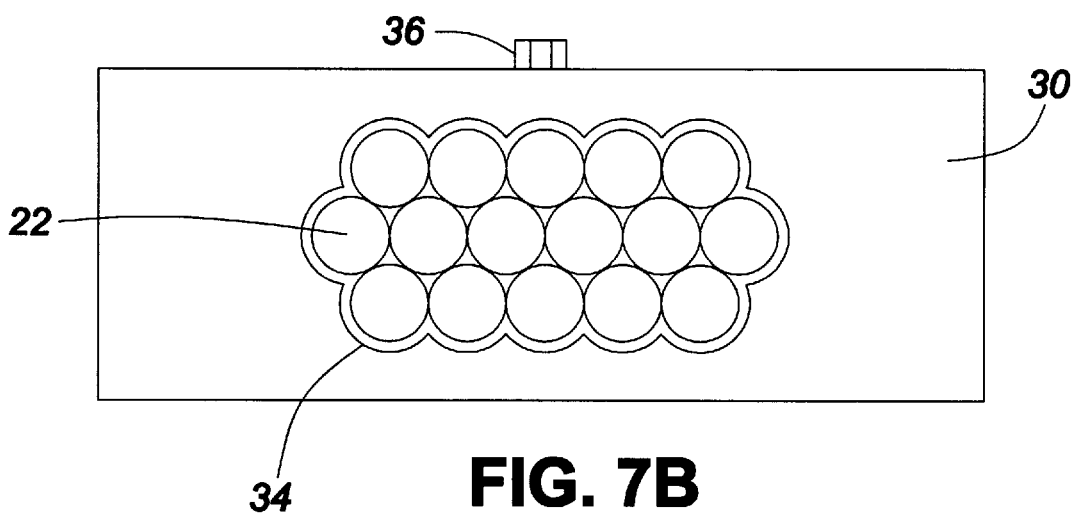
FIG. 7B is a transverse sectional view of a tuned multiple optical connector in accordance with the present invention wherein all optical fibres are retained in one bore.
Figure 7C:
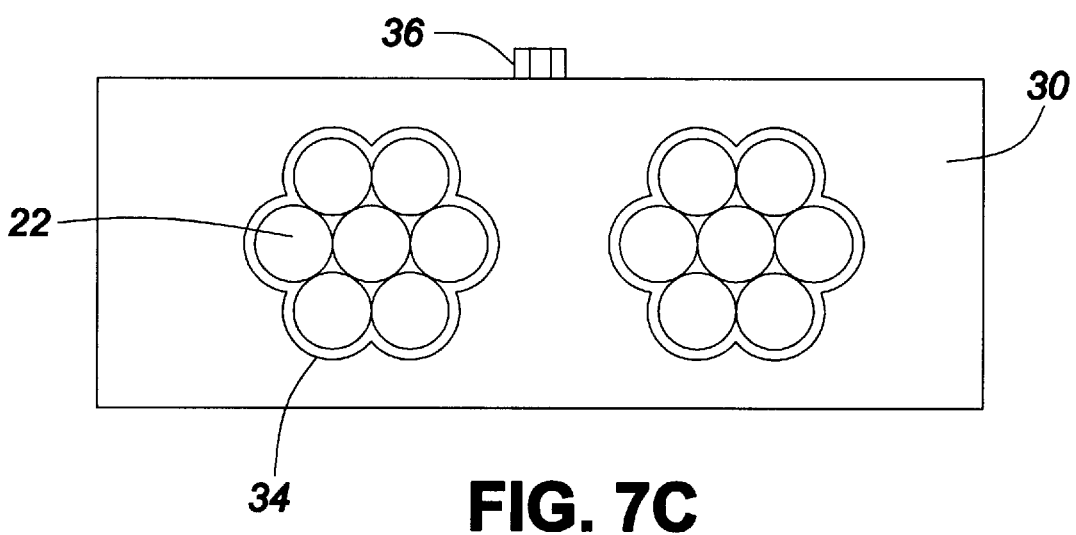
FIG. 7C is a transverse sectional view of a tuned multiple optical connector in accordance with the present invention wherein a housing comprises several bores, each bore retaining several optical fibres.

FIGS. 7A to 7C illustrate various arrangements of optical fibre ends 22 retained in a connector housing 30 according to the present invention. In FIG. 7A each of the optical fibre ends 22 is retained separately in a bore 34. This embodiment is advantageous for manufacturing because each fibre end 22 is oriented and affixed separately. In the embodiment shown in FIG. 7B all optical fibre ends 22 are retained in one bore 34. This arrangement of optical fibres requires the smallest amount of space but is difficult to manufacture because all fibres ends 22 are affixed at a same time. FIG. 7C shows an arrangement of the optical fibre ends 22 wherein the connector housing 30 comprises several bores 34 with each bore 34 retaining several fibre ends 22. Affixing the fibres is eased in this embodiment due to a reduced number of fibres retained in a single bore 34.

Figure 8A:
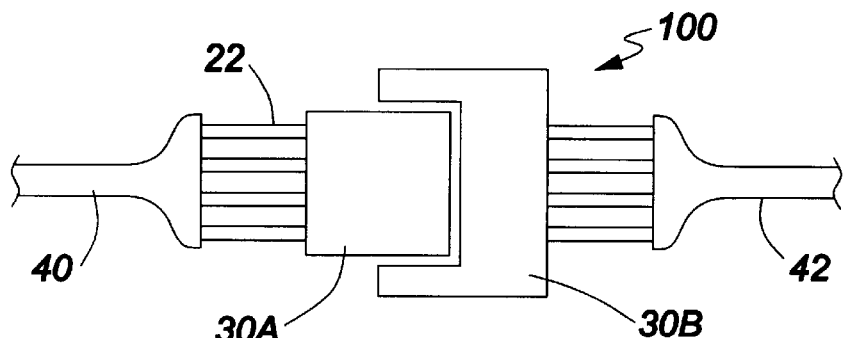
FIG. 8A illustrates a tuned multiple optical connector in accordance with the present invention comprising male and female connector housings.
Figure 8B:
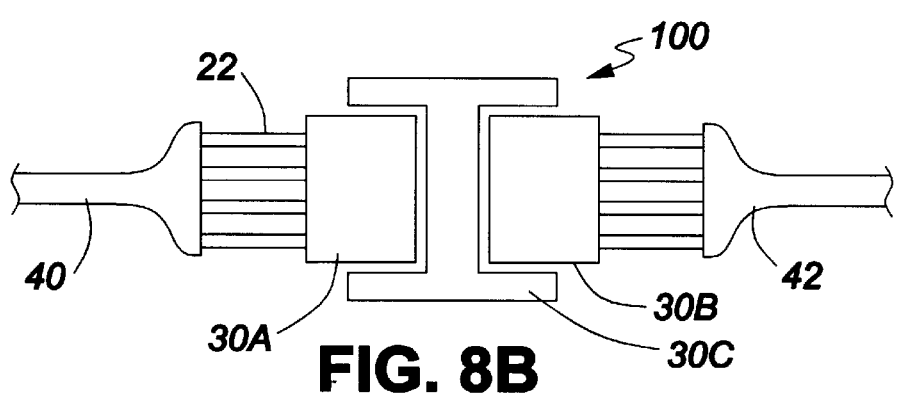
FIG. 8B illustrates a tuned multiple optical connector in accordance with the present invention comprising two connector housings having a same shape mated together by a third intermediate housing.
Figure 8C:
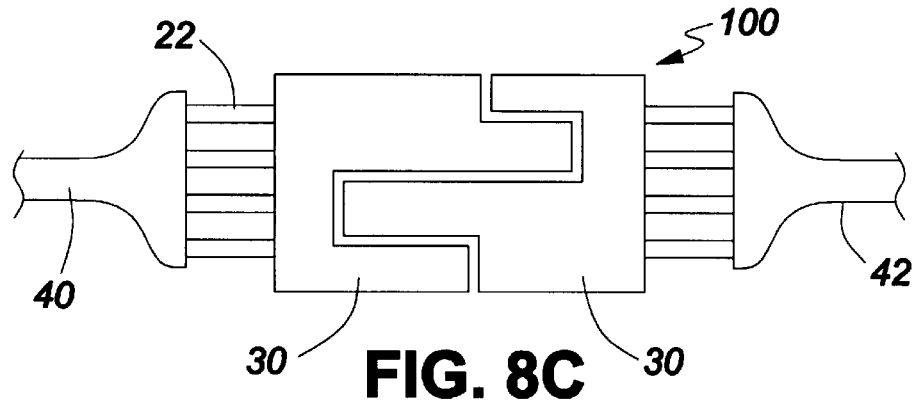
FIG. 8C illustrates a tuned multiple optical connector in accordance with the present invention comprising two connector housings having a same shape mated together.
Figure 8D:
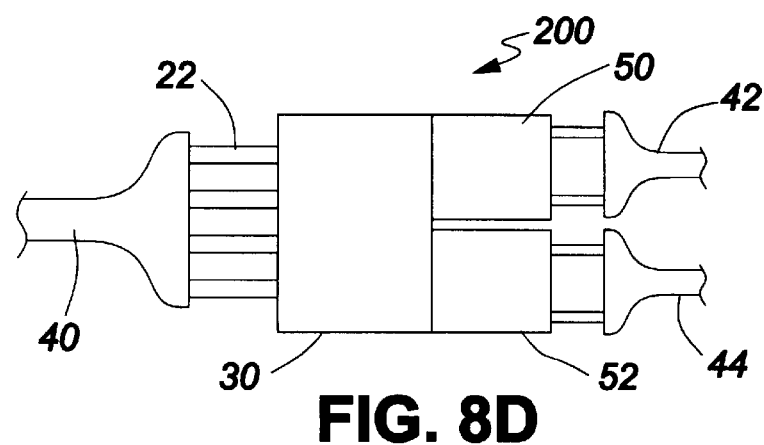
FIG. 8D illustrates a tuned multiple optical connector in accordance with the present invention comprising a first connector housing mated with two connector housings.

FIGS. 8A to 8D illustrate different embodiments of a multiple fibre optic cable and connector assembly. Two push-pull connector housings 30A, 30B join fibre ends from a first optical cable 40 and a second optical cable 42. The individual optical fibres are separated and stripped to expose the fibre ends 22 for placement in the connector housings 30A, 30B. A sufficient length of fibre is exposed to permit rotation of the fibre end through 180 degrees. Of course, a jacketed fibre is also rotatable and is considered exposed as that term is used herein. The loose fibres are provided with strain relief support elements and a covering (not shown). In the embodiment shown in FIG. 8A, two connector housings 30A, 30B of different shape to form a male and a female part are mated to couple the ends of the two fibre optic cables 40 and 42. FIG. 8B shows two connector housings 30 of a same shape mated by a third intermediate housing 30C. This embodiment allows the use of fibre optic cables having a same connector housing 30 on both ends and therefore provides more flexibility during an installation of a network. These advantages are also provided by the connector housings shown in FIG. 8C where both connector housings 30 have a same shape, and do not need a third intermediate housing for mating the two connector housings 30. FIG. 8D illustrates a multiple optical connector assembly 200 wherein one connector housing 30 is mated with two connector housings 50 and 52 to split one fibre optic cable 40 retaining a plurality of fibres into two fibre optic cables 42 and 44 each retaining fewer fibres. This is very useful for network applications where many parallel optical fibres are needed, for example, at a central station leading to different locations. Of course, such a connector assembly is useful for splitting a fibre optic cable into any number of fibre optic cables.

FIG. 9A illustrates a transverse section through another embodiment of a multiple connector in accordance with the present invention. Each optical fibre end 22 is supported by a ferrule 5, and the ferrules 5 are positioned in individual bores 34 within the connector housing 30, wherein each bore 34 has cross section in the form of a quadratic cross section. A co-operative engagement between the ferrule 5 and the bore 34 is provided. As shown in FIG. 9A the ferrule has a flattened face 6 for engaging one of the sidewalls 19 of the bore 34. A close fit prevents the ferrule 5 from rotating in position. It is evident to those of skill in the art that the term close fit relates to reasonable tolerances and not necessarily to a tight fit. Tolerances are selected based on design requirements and, as such, will vary. As shown, the ferrule 5 may be positioned with the engaging face 6 against any one of the four sidewalls 19. In another embodiment shown in FIG. 9B the ferrule 5 comprises etched grooves 62 in a circumferential arrangement. Engaging one of the grooves 62 with a pin 60 in the connector housing bore 34 prevents the ferrule 5 from rotating in position. FIG. 9C shows another aligned connector assembly in transverse section. Each of the ferrules 5 has an octagonal surrounding collar 64 to engage matching angular surfaces 66 of the connector housing bores 34. Optionally, a plurality of optical fibres 22 are retained in one ferrule 5 as illustrated in FIG. 9D. Further optionally, a plurality of ferrules 5 is retained in one connector housing bore 34 as shown in FIG. 9E, wherein the ferrules 5 have, for example, a hexagonal cross section.

A connector housing wherein optical fibre ends are supported by a ferrule 5 is manufactured by iteratively determining the core orientation of each optical fibre end 22 with respect to a reference point of the ferrule 5. When the core orientation is the predetermined core orientation the optical fibre end is affixed in the ferrule 5 such that the core of each of the optical fibre ends is oriented in a predetermined fashion with respect to an indicator element of the ferrule 5. Indicator elements are, for example, a groove 62 or a flattened face 6. When the core orientation is other than the predetermined orientation, the core orientation of the optical fibre end 22 is altered. After the optical fibre 22 has been affixed in the ferrule 5, the ferrule 5 is inserted into a bore 34 of the connector housing 30 such that the key element of the ferrule 5 is disposed in a predetermined relation to a key element 36 of the connector housing 30. After insertion the ferrule 5 is affixed in the bore 34.

In another embodiment a multiple fibre optic connector for connecting a first plurality of optical fibre ends 22 to a second plurality of optical fibre ends 22 is tuned by mating a first connector housing 30A with a second connector housing 30B such that key elements 36 are disposed in a predetermined relation one to the other indicating mating of the two connector housings 30A, 30B in one and only one orientation. Then, each of the first plurality of optical fibre ends 22 and the corresponding fibre end of the second plurality of optical fibre ends 22 are placed into a first connector housing 30A and second connector housing 30B, respectively, such that cores of the first plurality of optical fibre ends 22 and the corresponding core of the second plurality of optical fibre ends 22 have a first orientation relative to each other. Simultaneously light is launched through each of the first and second plurality of optical fibres. The relative orientation of the cores 32 of each fibre pair is adjusted until a preferred coupling is obtained. When a preferred coupling is obtained the orientation of the fibre cores 32 with respect to the key elements 36 is secured by affixing the fibres ends 22 within the connector housings 30A, 30B.

Preferably, each optical fibre end is retained in a ferrule 5 for support. It is important to provide nearly concentric rotation of the ferrule within the bore so that eccentricities in the position of the fibre core are adjusted without introducing additional change in position from the engaging between the ferrule and the bore. Clearly, some error will occur in manufacture.

In a further embodiment, a connector according to the invention is formed such that individual fibre alignments within the multiple fibre connector are purposely skewed or offset by individually adjusting particular connectors so as to provide a preferred amount of attenuation between predetermined pairs. Hence, the individual adjustability provides enhanced coupling between individual pairs, or alternatively reduced coupling between particular pairs. Such a connector is highly advantageous in communication networks to equalise the signal intensity in parallel optical fibres after an imbalanced switching device or filtering process.

The invention disclosed herein provides a tuned multiple optical connector by aligning cores of a plurality of optical fibre ends with respect to a key element of a connector housing retaining said optical fibre ends. Standardisation of the orientation of the cores of the optical fibre ends provides multiple optical connectors for connecting fibre optic cables without significant signal loss or alternatively, with predetermined signal loss. It further allows connection of any fibre optic cables comprising such connectors without adjustment of core orientation during installation.

A tunable multiple optical connector allowing tuning of individual optical fibre alignments within the multiple optical connector is disclosed. The connector provides a method of individually tuning optical fibre alignment within such a connector for correcting manufacturing irregularities and other imprecision relating to connector construction and use. Of course, numerous other embodiments may be envisaged, without departing from the spirit and scope of the invention.

What is claimed is:

1. A tuned multiple fibre optic connector for connecting a first plurality of optical fibre ends to a second plurality of optical fibre ends, each fibre end having an eccentrically positioned core therein, comprising:

a first connector housing comprising a first key element, the first connector housing for retaining each of the first plurality of optical fibre ends, the core of each of the first plurality of optical fibre ends oriented with respect to the first key element in a predetermined azimuthal fashion in a plane perpendicular to the longitudinal axis of the fibre; and first coupling means for coupling the first connector housing to another connector housing.

2. A tuned multiple fibre optic connector for connecting a first plurality of optical fibre ends to a second plurality of optical fibre ends as defined in claim 1, comprising:

a second connector housing comprising a second key element, the second connector housing for retaining each of the second plurality of optical fibre ends in a predetermined location and a core of each of the second plurality of optical fibre ends oriented in a plane perpendicular to the longitudinal axis of the fibre in a predetermined fashion with respect to the second key element; and, second coupling mechanism for coupling with the first coupling means such that when the second key element and the first key element are disposed in a predetermined relation one to the other, the core of each of the second plurality of optical fibre ends is approximately in alignment with the core of a corresponding optical fibre end of the first plurality of optical fibre ends.

3. A tuned multiple fibre optic connector for connecting a first plurality of optical fibre ends to a second plurality of optical fibre ends as defined in claim 1, wherein the first key element is a mating key element for substantially limiting coupling of the first connector housing and another second connector housing to a single orientation.

4. A tuned multiple fibre optic connector for connecting a first plurality of optical fibre ends to a second plurality of optical fibre ends as defined in claim 1, wherein the first connector housing comprises a plurality of bores, each bore for retaining one optical fibre end.

5. A tuned multiple fibre optic connector for connecting a first plurality of optical fibre ends to a second plurality of optical fibre ends as defined in claim 1, wherein the first connector housing comprises a bore for retaining a plurality of optical fibre ends.

6. A tuned multiple fibre optic connector for connecting a first plurality of optical fibre ends to a second plurality of optical fibre ends as defined in claim 2, further comprising a third connector housing for coupling the first connector housing to the second connector housing.

7. A tuned multiple fibre optic connector for connecting a first plurality of optical fibre ends to a second plurality of optical fibre ends as defined in claim 1, wherein the first connector housing and another second connector housing are substantially identical and mate one with the other in one and only one orientation.

8. A tuned multiple fibre optic connector for connecting a first plurality of optical fibre ends to a second plurality of optical fibre ends as defined in claim 1, wherein the key element comprises a pin.

9. A tuned multiple fibre optic connector for connecting a first plurality of optical fibre ends to a second plurality of optical fibre ends as defined in claim 1, wherein the key element comprises a coloured mark.

10. A tuned multiple fibre optic connector for connecting a first plurality of optical fibre ends to a second plurality of optical fibre ends as defined in claim 2, wherein the first and second key elements comprise mating asymmetric bodies on the first and second connector housing, respectively.

11. A tuned multiple fibre optic connector for connecting a first plurality of optical fibre ends to a second plurality of optical fibre ends as defined in claim 4, wherein all cores of the optical fibre ends are oriented toward a same side of the corresponding bores in a plane perpendicular to the longitudinal axis of the fibre.

12. A tuned multiple fibre optic connector for connecting a first plurality of optical fibre ends to a second plurality of optical fibre ends as defined in claim 1, wherein the cores of the optical fibre ends on one side of a line of symmetry of the connector are oriented in a plane perpendicular to the longitudinal axis of the fibre, in a first direction, and the cores of the optical fibre ends on the other side of the line of symmetry are oriented in a plane perpendicular to the longitudinal axis of the fibre, in a second opposite direction, 180° from the first direction.

13. A tuned multiple fibre optic connector for connecting a first plurality of optical fibre ends to a second plurality of optical fibre ends as defined in claim 4, wherein the bores are arranged in a circular fashion and the cores of the optical fibre ends are oriented in a same direction in a plane perpendicular to the longitudinal axes of the fibers relative to a straight line through a center of the circle and a center of each bore.

14. A tuned multiple fibre optic connector for connecting a first plurality of optical fibre ends to a second plurality of optical fibre ends, each fibre having an eccentrically positioned core therein, comprising:

a first plurality of optical fibre ends, wherein each optical fibre end is retained in a ferrule having at least an indicator element such that a core of the optical fibre end is oriented in a plane perpendicular to the longitudinal axis of the fibre, the orientation in a predetermined azimuthal fashion with respect to an indicator element of the ferrule; a first connector housing comprising a first key element, the first connector housing for retaining each of the first plurality of optical fibre ends in a predetermined location such that the indicator elements of the ferrules are disposed in a predetermined location such that the indicator elements of the ferrules are disposed in a predetermined azimuthal relation to the first key element of the first connector housing; and first coupling means for coupling the first connector housing to another connector housing.

15. A tuned multiple fibre optic connector for connecting a first plurality of optical fibre ends to a second plurality of optical fibre ends as defined in claim 14, comprising: a second plurality of optical fibre ends, wherein each optical fibre end is retained in a ferrule such that a core of the optical fibre end is oriented in a plane perpendicular to the longitudinal axis of the fibre, the orientation in a predetermined fashion with respect to an indicator element of the ferrule; a second connector housing comprising a second key element, the second connector housing for retaining each of the second plurality of optical fibre ends in a predetermined location such that the indicator elements of the ferrules are disposed in a predetermined relation to the second key element of the connector housing; and, second coupling means for coupling with the first coupling means such that when the second key element and a first key element of the first connector housing are disposed in a predetermined relation one to the other, the core of each of the second plurality of optical fibre ends is substantially in alignment with the core of a corresponding optical fibre end of the first end of the first plurality of optical fibre ends retained in the first connector housing.

16. A tuned multiple fibre optic connector for connecting a first plurality of optical fibre ends to a second plurality of optical fibre ends as defined in claim 14, wherein the ferrule retains a plurality of optical fibre ends.

* * * * *